(12) United States Patent
Yielding et al.

(10) Patent No.: US 6,948,887 B1
(45) Date of Patent: Sep. 27, 2005

(54) TRANSPORT CONTAINER HAVING COMPARTMENTS THAT CAN BE INDIVIDUALLY PRESSURIZED

(75) Inventors: Bryan Yielding, Riceville, TN (US); David Turner, Athens, TN (US); Michael Glinsky, Landisville, PA (US); David A. Bechtold, Manheim, PA (US); Brian Polgrean, Lancaster, PA (US)

(73) Assignee: Delaware Capital Formation, Inc., Wilmington, DE (US)

( * ) Notice: Subject to any disclaimer, the term of this patent is extended or adjusted under 35 U.S.C. 154(b) by 92 days.

(21) Appl. No.: 10/422,517

(22) Filed: Apr. 24, 2003

Related U.S. Application Data
(60) Provisional application No. 60/376,151, filed on Apr. 25, 2002.

(51) Int. Cl.$^7$ .............................................. B65G 53/36
(52) U.S. Cl. ...................... 406/119; 406/146; 222/399
(58) Field of Search ................... 406/119, 120, 406/136, 146; 222/399

(56) References Cited

U.S. PATENT DOCUMENTS

| | | | | |
|---|---|---|---|---|
| 1,773,619 A | * | 8/1930 | Goebels ...................... 366/106 |
| 2,498,229 A | * | 2/1950 | Adler ........................... 141/26 |
| 2,901,133 A | * | 8/1959 | Weller ......................... 406/119 |
| 3,689,045 A | * | 9/1972 | Coulter et al. ................ 266/82 |
| 3,868,042 A | | 2/1975 | Bodenheimer |
| 4,101,175 A | * | 7/1978 | Kull ............................ 406/123 |
| 4,131,214 A | * | 12/1978 | Rogers ........................... 222/1 |
| 4,138,163 A | | 2/1979 | Calvert |
| 4,325,560 A | * | 4/1982 | Hirvonen .................... 280/838 |
| 4,799,607 A | | 1/1989 | Podd |
| 4,823,989 A | * | 4/1989 | Nilsson ....................... 222/630 |
| 4,836,411 A | | 6/1989 | Jones |
| 4,917,544 A | * | 4/1990 | Crahan et al. ................ 406/14 |
| 5,022,809 A | | 6/1991 | Hinson |
| 5,073,259 A | | 12/1991 | Solimar |
| 5,244,332 A | | 9/1993 | Krein et al. |
| 5,248,227 A | * | 9/1993 | Hidock et al. ................ 406/41 |
| 5,318,193 A | | 6/1994 | Podd, Sr. et al. |
| 5,383,566 A | | 1/1995 | Johnson |
| 5,595,315 A | | 1/1997 | Podd et al. |
| 5,758,795 A | | 6/1998 | Johnson |
| 5,819,979 A | | 10/1998 | Murphy et al. |
| 5,855,456 A | | 1/1999 | Mueller |
| 5,880,958 A | | 3/1999 | Helms et al. |
| 6,206,623 B1 | | 3/2001 | Podd |
| 6,533,142 B1 | * | 3/2003 | Hynick ......................... 222/61 |

\* cited by examiner

Primary Examiner—Joe Dillon, Jr.
(74) Attorney, Agent, or Firm—Chambliss, Bahner & Stophel, P.C.

(57) ABSTRACT

A container for use in transporting particulate materials includes a plurality of product compartments, with each such compartment having a material outlet in communication therewith through which particulate material in the compartment may be discharged. The container also includes a gas-tight bulkhead separating a pair of adjacent product compartments, and an unloading system that is adapted for removal of particulate materials from the product compartments. The unloading system includes a source for supplying a pressurizing gas, and one or more top air conduits connecting the pressurizing gas source to the product compartments for conveying pressurizing gas to the product compartments. The unloading system also includes a material conveying conduit that is in fluid communication with one or more of the material outlets and which includes a discharge end through which particulate material may be unloaded. The unloading system is adapted for selectively pressurizing one or more of the product compartments so that particulate material may be discharged through the material outlet of a product compartment that is pressurized. The unloading system is also adapted for entraining material that is discharged through a material outlet in the material conveying conduit and conveying such material to the discharge end of the conduit.

13 Claims, 5 Drawing Sheets

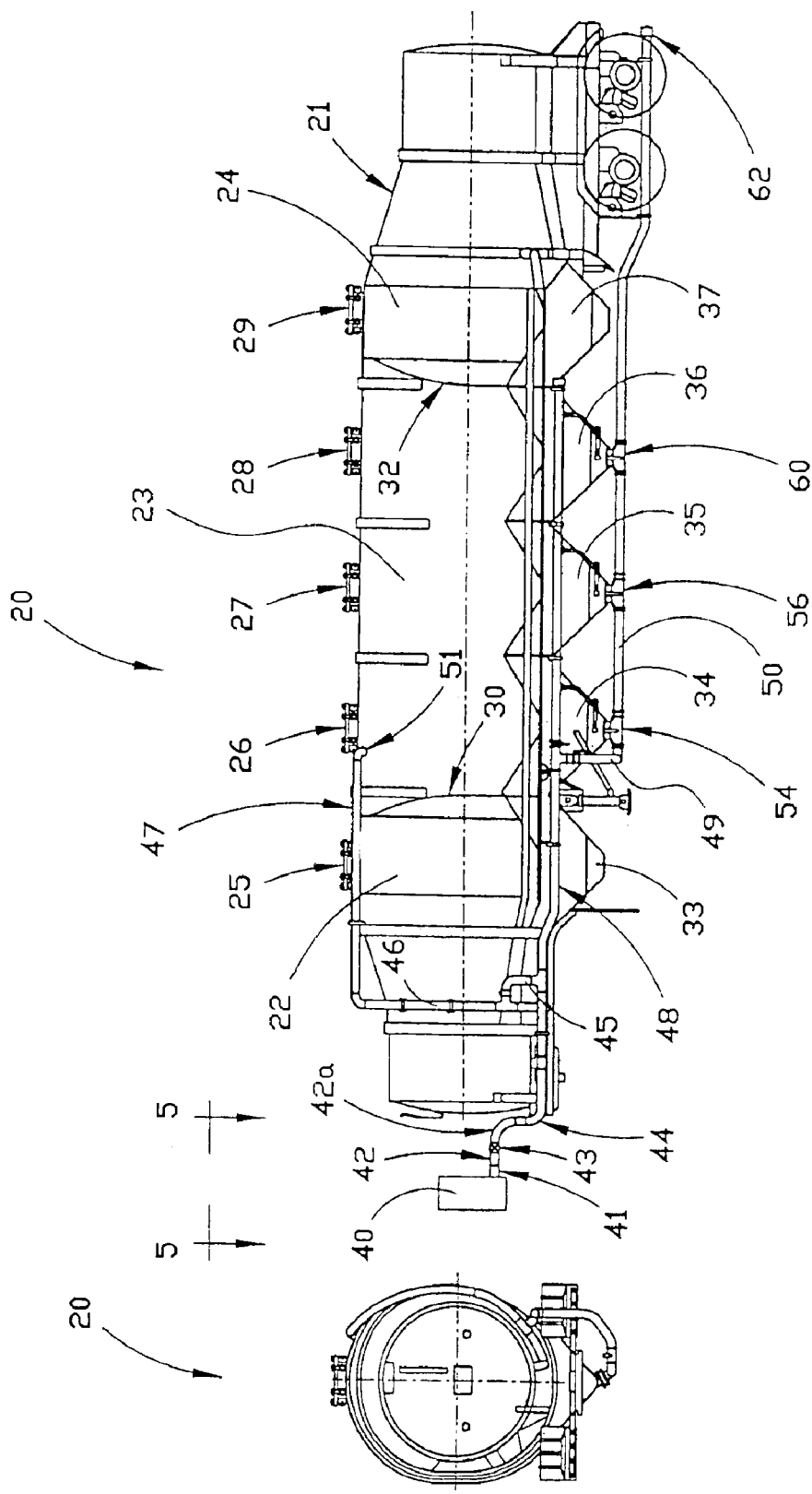

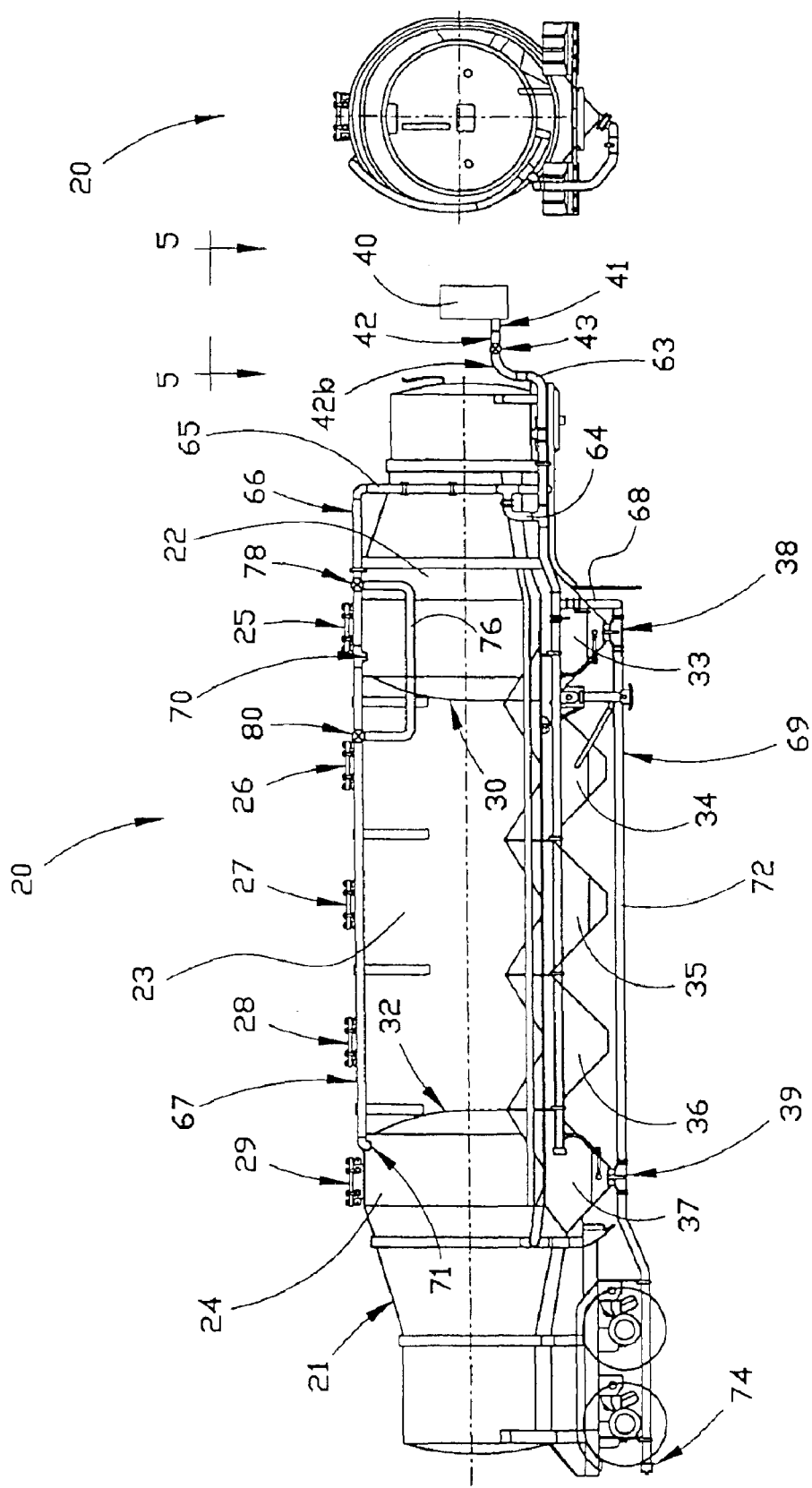

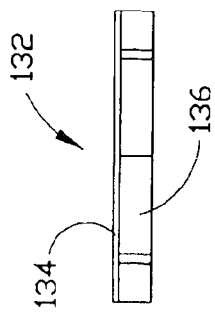
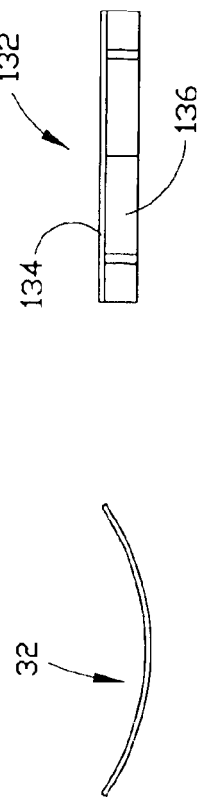
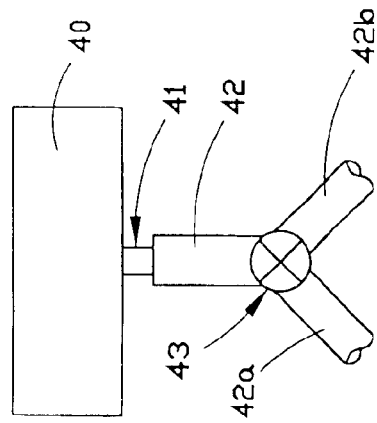
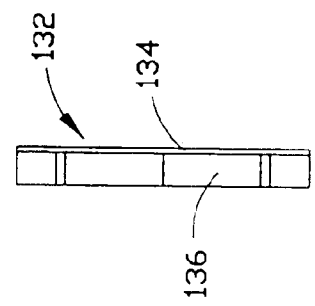
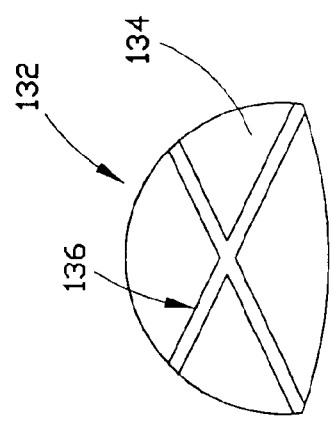
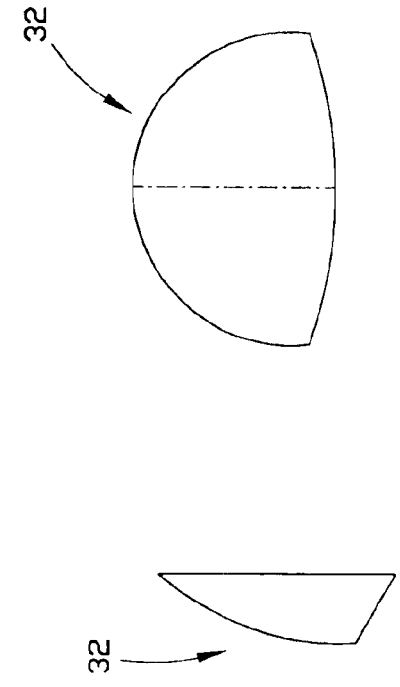

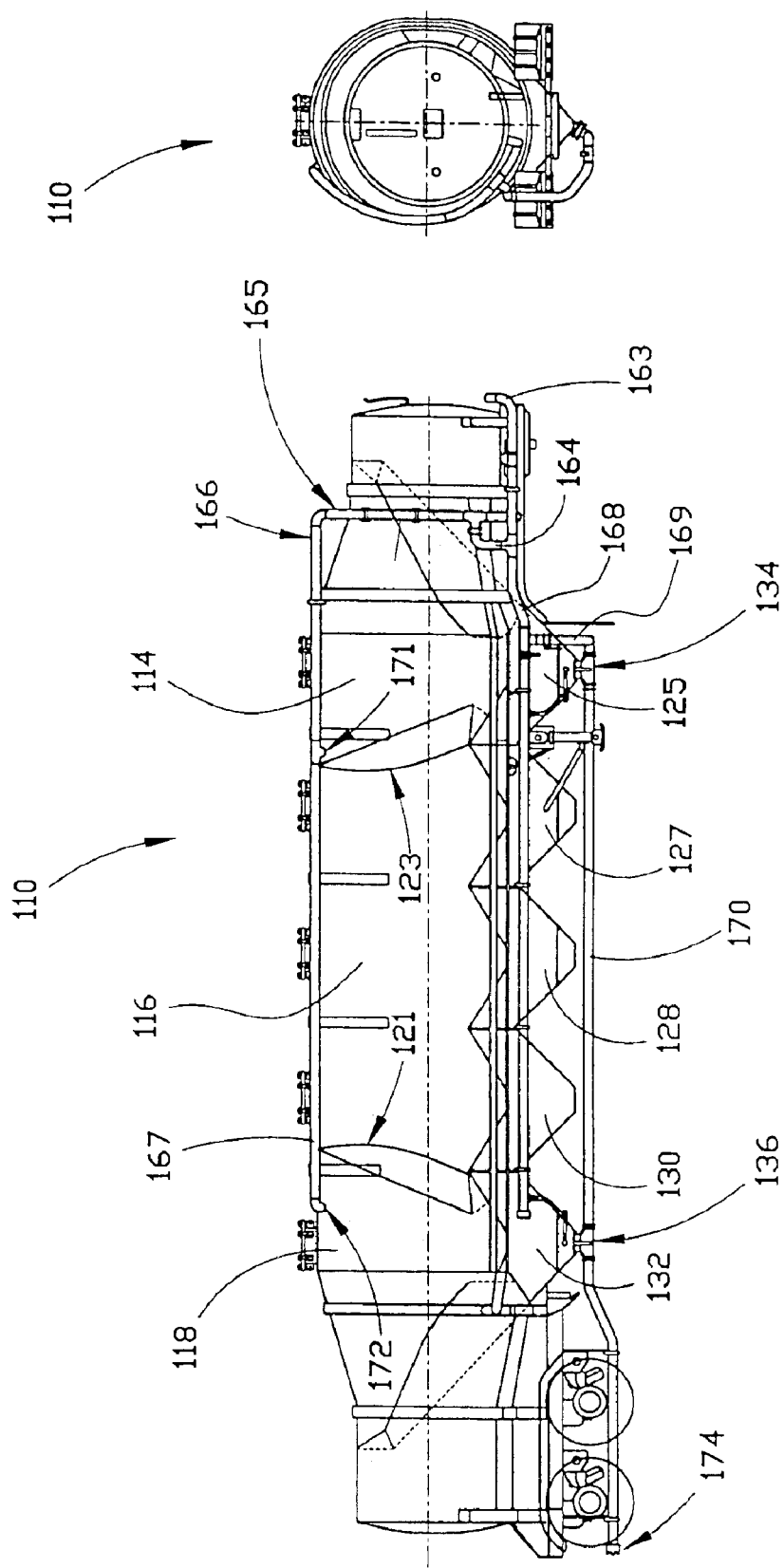

TRANSPORT CONTAINER HAVING COMPARTMENTS THAT CAN BE INDIVIDUALLY PRESSURIZED

CROSS REFERENCE TO RELATED APPLICATION

This application claims the benefit of U.S. Provisional Application No. 60/376,151, entitled "Transport Container Having Compartments That Can Be Individually Pressurized", which was filed on Apr. 25, 2002.

FIELD OF THE INVENTION

This invention relates generally to containers that are used to transport particulate materials, and more particularly to such containers that are loaded and unloaded by pressure-induced gas- or air-entrainment. Specifically, the invention relates to such a container that can be used to transport different types of particulate materials at the same time, or different types of materials on forward-haul and back-haul trips.

BACKGROUND AND DESCRIPTION OF THE PRIOR ART

Many particulate materials are conveniently transported by truck, although they may also be transported by railcar, barge or by other means. Trucks that are used to transport such materials may include a tractor and an attached trailer having a tank or other container mounted thereon. Such trailers may also be loaded on railcars or barges, or a container may be mounted directly on a railcar or barge. Frequently, these transport containers are referred to as pneumatic containers because of the pneumatic method, involving gas- or air-entrainment, by which they may be loaded and unloaded. Materials that are generally stored or transported in pneumatic containers include agricultural products such as grain, corn kernels, beans, flour, sugar, peanuts and the like, lightweight aggregate products, and intermediate products for various industrial uses such as plastic pellets or powders, coke, lime, silica gel, powdered acid resins, rare earth powders and powdered alumina.

Pneumatic containers generally include one or more product compartments that are usually cylindrical or spherical in shape in order to facilitate unloading by a method which involves pressurizing the compartments. Cylindrical or spherical product compartments are also generally easy to completely empty. Each product compartment is provided with a discharge hopper that may be generally cylindrical or conical in shape. The product compartments are generally enclosed by a sheet metal sheath, especially when the container is mounted on a trailer or other transport device, which sheath provides an aerodynamically efficient outer container surface.

One type of known construction of such pneumatic containers comprises two or more generally cylindrical and horizontally disposed product compartments which are arranged along a common horizontal axis in at least partial fluid communication with each other. A cylindrical or conical discharge hopper is provided for each product compartment, and the axis of each such discharge hopper intersects the product compartment with which it is associated generally at right angles to the axis of the cylinder of the product compartment. Each discharge hopper has a material outlet at the bottom and a valve which controls the entry of material into the outlet. An unloading system is also provided which includes a blower or other mechanism for pressurizing air or another gas. The blower provides the energy required for unloading the material from the container in the form of compressed air or another gas. One end of a pressurizing gas conduit is attached to the blower and the other end to a pressurizing gas inlet in the container. Operation of the blower will compress air or gas and move it through the pressurizing gas inlet into the container, thereby increasing the pressure of the air or gas above the material in the product compartments in the container in order to assist in discharging material through the hopper outlets. One end of a material conveying conduit is also attached to the blower and extends past and connects to each material outlet so that when the product compartment has been pressurized, air or another gas may be directed into the material conveying conduit to entrain material passing through each material outlet and carry it to the discharge end of the conduit. The container may be mounted on a frame which is supported by the chassis of a trailer.

Because the product compartments of the conventional container are in at least partial fluid communication with each other, only one type of product may be transported at a time. Thus it is generally economically necessary that sufficient product of one type be transported to fill the entire container. In addition, because particulate products are not often compatible with each other and facilities for cleaning containers of this type are usually only available at the carrier's terminal, it is generally impossible to transport one product on the forward-haul trip and another on the back-haul.

It would be desirable if a transport container could be developed in which two or more different types of particulate materials could be transported at the same time, or one type of material could be transported on a forward-haul trip and another type of material on the back-haul trip.

ADVANTAGES OF THE INVENTION

Among the advantages of the invention is that it provides a transport container in which two different types of particulate materials may be transported at the same time, with each type being unloaded separately. Another advantage of the invention is the provision of such a container in which one type of material can be transported on a forward-haul trip and another type of material can be transported on a back-haul trip.

Additional objects and advantages of this invention will become apparent from an examination of the drawings and the ensuing description.

EXPLANATION OF TECHNICAL TERMS

As used herein, the term particulate material refers to granular, fluent or comminuted material that is capable of being transported through a conduit by an entraining gas.

As used herein, the term container refers to an enclosure for particulate materials that may include one or more product compartments.

As used herein the term pressurizing gas refers to the air or gas that is introduced into a pressurizing gas inlet of a product compartment in order to increase the pressure therein.

SUMMARY OF THE INVENTION

The invention comprises a container for use in transporting particulate materials. The container includes a plurality of product compartments, with each such compartment having a material outlet in communication therewith through which particulate material in the compartment may be discharged. The container also includes a gas-tight bulkhead separating a pair of adjacent product compartments, and an unloading system that is adapted for removal of particulate materials from the product compartments. The unloading system includes a source for supplying a pressurizing gas and one or more top air conduits connecting the pressurizing gas source to the product compartments for conveying pressurizing gas to the product compartments. The unloading system also includes a material conveying conduit that is in fluid communication with one or more of the material outlets, which conduit includes a discharge end through which particulate material may be unloaded. The unloading system is adapted for selectively pressurizing one or more of the product compartments so that particulate material may be discharged through the material outlet of a product compartment that is pressurized. The unloading system is also adapted for entraining material that is discharged through a material outlet in the material conveying conduit and for and conveying such material to the discharge end of the conduit.

In order to facilitate an understanding of the invention, the preferred embodiments of the invention are illustrated in the drawings, and a detailed description thereof follows. It is not intended, however, that the invention be limited to the particular embodiments described or to use in connection with the apparatus illustrated herein. Various modifications and alternative embodiments such as would ordinarily occur to one skilled in the art to which the invention relates are also contemplated and included within the scope of the invention described and claimed herein.

BRIEF DESCRIPTION OF THE DRAWINGS

The presently preferred embodiments of the invention are illustrated in the accompanying drawings, in which like reference numerals represent like parts throughout, and in which:

FIG. 1 is a streetside view of a trailer on which is mounted a container according to a first embodiment of the invention.

FIG. 2 is a front view of the trailer of FIG. 1.

FIG. 3 is a curbside view of the trailer of FIGS. 1 and 2.

FIG. 4 is a front view of the trailer of FIGS. 1–3.

FIG. 5 is a top view of a preferred gas source taken along the lines 5—5 of FIGS. 1 and 3.

FIG. 6 is a side view of a preferred embodiment of the bulkhead of the invention.

FIG. 7 is a rear view of the bulkhead of FIG. 6.

FIG. 8 is a top view of the bulkhead of FIGS. 6 and 7.

FIG. 9 is a side view of a second embodiment of the bulkhead of the invention.

FIG. 10 is a rear view of the bulkhead of FIG. 9.

FIG. 11 is a top view of the bulkhead of FIGS. 9 and 10.

FIG. 14 is a curbside view of the trailer of FIGS. 12 and 13.

FIG. 15 is a front view of the trailer of FIG. 14.

DESCRIPTION OF THE PREFERRED EMBODIMENTS OF THE INVENTION

Figures 12, 13:
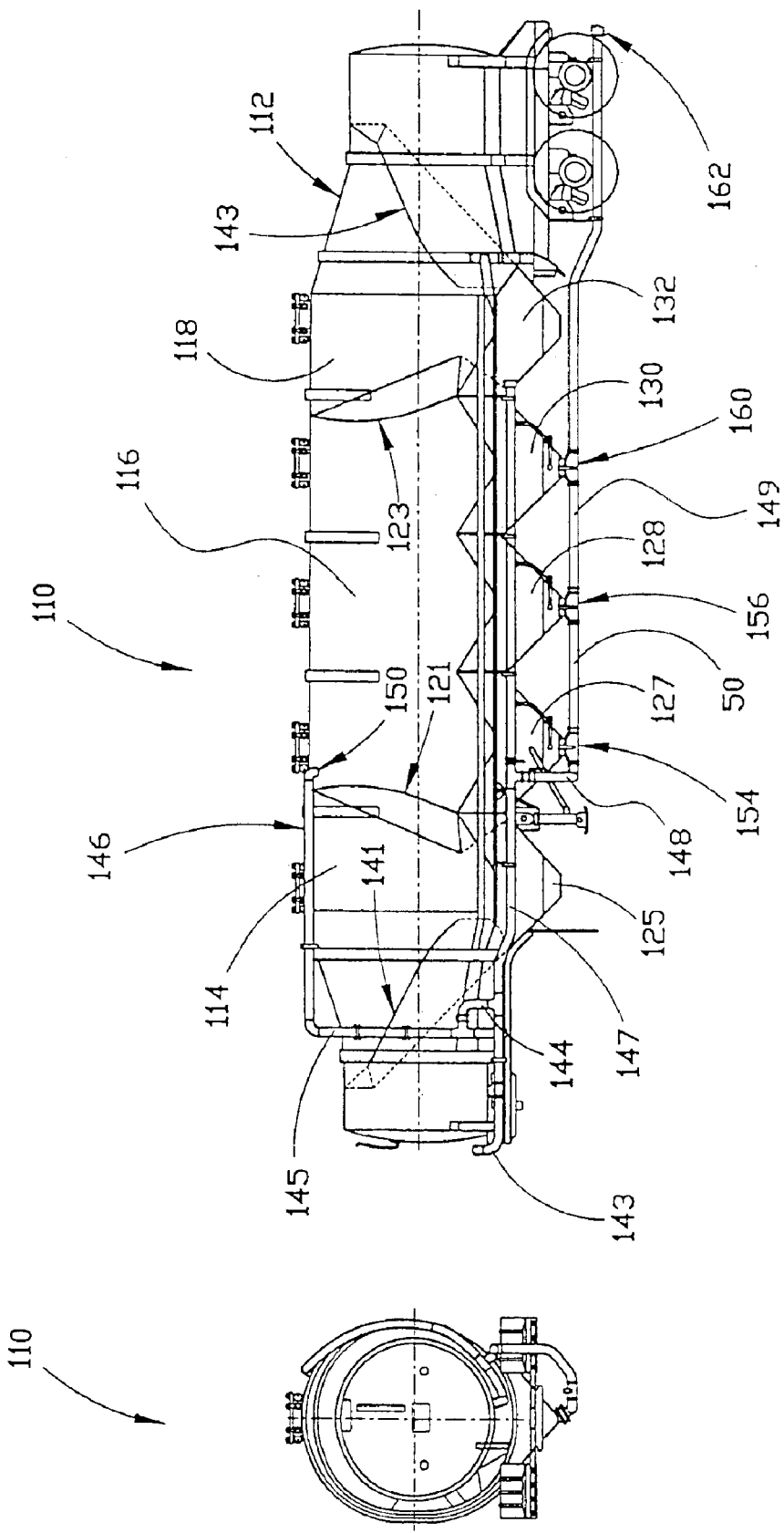
FIG. 12 is a streetside view of a trailer on which is mounted a container according to a second embodiment of the invention.
FIG. 13 is a front view of the trailer of FIG. 12.

Referring now to the drawings, the method and apparatus of the invention are illustrated by the presently preferred embodiments of a trailer-mounted container. FIGS. 1–5 illustrate a first embodiment of the invention in the form of trailer-mounted container 20. Container 20 is provided with shell 21, preferably of aluminum, and includes three generally cylindrical and horizontally disposed product compartments 22, 23 and 24 which are arranged along a common horizontal axis. Access to front compartment 22 is provided by way of hatch 25. Access to middle compartment 23 is provided by hatches 26, 27 and 28, and access to rear compartment 24 is provided by hatch 29. Front compartment 22 is separated from middle compartment 23 by a gas-tight bulkhead such as bulkhead 30 and middle compartment 23 and rear compartment 24 are separated by a gas-tight bulkhead such as bulkhead 32. At least one material outlet is in communication with each product compartment, preferably through a conical discharge hopper associated therewith. Thus, as shown in FIGS. 1 and 3, conical discharge hoppers 33, 34, 35, 36 and 37 are preferably provided for the three product compartments. As shown in the drawings, hopper 33 is provided for compartment 22, hoppers 34, 35 and 36 are provided for compartment 23 and hopper 37 is provided for compartment 24. It is also preferred that the material outlets be located at the bottom of each discharge hopper, and that one or more valves (not all of which are shown), such as valves 38 and 39 (shown in FIG. 3), arc provided to control the discharge of material from the material outlet of the product compartment.

An unloading system is also provided which includes a blower or compressor for pressurizing air or another gas or another means or source for supplying a flow of pressurizing gas. A blower or compressor is typically mounted on a tractor that is used to haul the trailer, and a schematic illustration of blower 40 is illustrated in FIGS. 1, 3 and 5. The blower has a pressurizing gas outlet 41 to which one end of conduit 42 may be attached. The other end of conduit 42 may be attached to either the pressurizing system for the middle compartment, which is preferably located on the streetside of the trailer (shown in FIGS. 1 and 2 but not in FIGS. 3 and 4), or to the pressurizing system for the front and rear compartments 22 and 24, which is preferably located on the curbside of the trailer (shown in FIGS. 3 and 4, but not in FIGS. 1 and 2). Preferably, as shown in FIG. 5, conduit 42 includes a valve 43 and conduit portions 42a and 42b, so that a single source for supplying a pressurizing gas may be provided for product compartments 22, 23 and 24. In this preferred embodiment, a single source may be used to selectively pressurize one or more of the product compartments so that particulate material may be discharged through the material outlet of a product compartment that is pressurized. In the alternative (although not shown in the drawings), one source for supplying a pressurizing gas may be provided for each of the product compartments, or one source may be provided for product compartments 22 and 24 and a separate source may be provided for product compartment 23. Preferably, the unloading system is adapted for selectively pressurizing one or more of the product compartments without pressurizing all of the product compartments.

In the embodiment of the invention illustrated in FIGS. 1–5, it is contemplated that one type of material, such as, for example, plastic pellets, may be transported in front compartment 22 and rear compartment 24, and a second type of material, such as, for example, sugar, may be transported in middle compartment 23. However, the invention is also susceptible to application to a container that is intended to transport a different type of material in each product compartment. In such event, it is preferred that a separate pressurizing system be provided for each compartment, or that the container include a bypass circuit (discussed in more detail hereinafter) to bypass the pressurizing gas inlet of front compartment 22 so that pressurizing gas can be directed selectively into either the front or the rear compartment.

Referring again to FIGS. 1 and 2, conduits 42 and 42a are provided to connect the blower to conduit 44. Conduit 44 directs pressurizing gas through conduits 45 and 46 to top air conduit 47 for middle compartment 23 and through conduits 48 and 49 to material conveying conduit 50. Top air conduit 47 is attached to (or terminates in) pressurizing gas inlet 51 of middle compartment 23. Preferably, the pressurizing gas inlet is located generally above the level of particulate material in the product compartment of the container. Operation of the blower will move air or gas through top air conduit 47 into the middle compartment, thereby increasing the pressure of the air or gas in the compartment in order to assist in discharging material from the outlets into material conveying conduit 50. As shown in FIG. 1, material conveying conduit 50 extends past and connects to each of the hopper material outlets of product compartment 23. When the system is operating and pressurizing gas is flowing from blower 40 and into material conveying conduit 50, valves 54, 56 and 60 may be opened to discharge particulate material into conduit 50, where such material may be entrained and conveyed to discharge end 62 of the conduit.

Referring now to FIGS. 1, 3 and 6–8, a preferred embodiment of bulkhead 32 is illustrated. As shown therein, bulkhead 32 is a curved piece of metal such as aluminum which is mounted, by welding or other suitable means, with its convex side facing into compartment 23. Preferred bulkhead 30 is identical to bulkhead 32, and is also mounted with its convex side facing into compartment 23. This configuration permits the bulkheads to be made of lighter material and still withstand the pressure difference when the middle compartment is pressurized while the front and rear compartments are not. The amount of curvature in the preferred bulkheads will depend on the pressure differential between the pressurized and unpressurized compartments, the thickness and type of material from which the bulkhead is formed and the shape and size of the compartment walls.

Another embodiment of the bulkhead is illustrated in FIGS. 9–11. In this embodiment, bulkhead 132 is comprised of flat plate 134 and reinforcement 136. Of course, other types and arrangements of reinforcement as are known to those having ordinary skill in the art to which the invention relates may also be employed, as may a bulkhead comprising a flat plate of sufficient thickness to withstand the pressure differential between the compartments (not shown).

Referring now to FIGS. 3, 4 and 5, the preferred pressurizing system for the front and rear compartments is illustrated. As shown therein, conduit 42b connects the blower to conduit 63. Conduit 63 directs pressurizing gas through conduits 64 and 65 to top air conduit 66 for front compartment 22, to top air conduit 67 (a continuation of conduit 66) for rear compartment 24 and through conduit 68 to material conveying conduit 69. Top air conduit 66 is attached to pressurizing gas inlet 70 of front compartment 22 and top air conduit 67 is attached to (or terminates in) pressurizing gas inlet 71 of rear compartment 24. Preferably, the pressurizing gas inlets are located generally above the level of particulate material in the front and rear product compartments of the container. Operation of the blower will move air or gas through top air conduit 66 into the front compartment and through top air conduit 67 into the rear compartment, thereby increasing the pressure of the air or gas in the front and rear compartments in order to assist in discharging material from the outlets into material conveying conduit 72. As shown in FIG. 3, material conveying conduit 72 extends past and connects to each of the hopper material outlets of product compartments 22 and 24. When the system is operating and pressurizing gas is flowing from blower 40 and into material conveying conduit 72, valves 38 and 39 may be opened to discharge particulate material into conduit 72, where such material may be entrained and conveyed to discharge end 74 of the conduit.

A preferred bypass circuit, by which the pressurizing gas inlet of front compartment 22 may be bypassed so that pressurizing gas can be directed selectively into either the front or the rear compartment, is also illustrated in FIG. 3. Preferably, the bypass circuit is mounted alongside the exterior of shell 21. As shown in FIG. 3, the preferred bypass circuit is comprised of bypass conduit 76 and valves 78 and 80. Valves 78 and 80 may be operated to direct pressurizing gas through any of three circuits. In a first circuit, valves 78 and 80 may be operated to direct pressurizing gas through conduit 66 to pressurizing gas inlet 70 of front compartment 22 and into conduit 67 to pressurizing gas inlet 71 of rear compartment 24. In a second circuit, valves 78 and 80 may be operated to direct pressurizing gas through conduit 66 to pressurizing gas inlet 70 of front compartment 22 without passing pressurizing gas into conduit 67. In a third circuit, valves 78 and 80 may be operated to direct pressurizing gas through conduits 66 and 76, bypassing pressurizing gas inlet 70 of front compartment 22, and into conduit 67 to pressurizing gas inlet 71 of rear compartment 24.

FIGS. 12–15 illustrate a second embodiment of the invention in the form of trailer-mounted container 110. Container 110 is provided with shell 112, preferably of aluminum, and includes three generally cylindrical and horizontally disposed product compartments 114, 116 and 118 which are arranged along a common horizontal axis. Front compartment 114 is separated from middle compartment 116 by gas-tight bulkhead 121 and middle compartment 116 and rear compartment 118 are separated by gas-tight bulkhead 123. Conical discharge hoppers 125, 127, 128, 130 and 132 are provided, at least one for each product compartment. As shown in the drawings, hopper 125 is provided for compartment 114, hoppers 127, 128 and 130 are provided for compartment 116 and hopper 132 is provided for compartment 118. Each discharge hopper has a material outlet at the bottom, and a valve (not all of which are shown), such as valves 134 and 136, which controls the discharge of material from the outlet of the hopper. An unloading system is also provided which includes a blower or compressor for pressurizing air or another gas or another means or source for supplying a flow of gas. A blower (not shown) such as blower 40 of the embodiment of FIGS. 1–5 is typically mounted on a tractor that is used to haul the trailer, which blower has a pressurizing gas outlet to which one end of a connecting conduit (similar to conduit 42 of the embodiment illustrated in FIGS. 1–5) may be attached. The connecting conduit will preferably connect the source of pressurizing gas to the pressurizing system for the middle compartment, which is preferably located on the streetside of the trailer (shown in FIGS. 12 and 13 but not in FIGS. 14 and 15), and to the pressurizing system for the front and rear compartments 114 and 118, which is preferably located on the curbside of the trailer (shown in FIGS. 14 and 15, but not in FIGS. 12 and 13) in a manner such as is illustrated in FIGS. 1–5.

In the embodiment of the invention illustrated in FIGS. 12–15, it is contemplated that one type of material, such as, for example, plastic pellets, may be transported in front compartment 114 and rear compartment 118, and a second type of material, such as, for example, sugar, may be transported in middle compartment 116. However, the invention is also susceptible to application to a container that is intended to transport a different type of material in each product compartment. In such event, it is preferred that a separate pressurizing system be provided for each compartment, or that the system of FIGS. 12–15 be modified (not shown) by adding a bypass circuit to bypass the pressurizing gas inlet of front compartment 114 so that pressurizing gas can be directed selectively into either the front or the rear compartment. This embodiment of the invention also includes end bulkheads 141 and 143 for front and rear compartments 114 and 118 respectively.

Referring again to FIGS. 12 and 13, one end of the connecting conduit (not shown) is attached to the blower (also not shown) and the other end is attached to conduit 143. Conduit 143 directs pressurizing gas through conduits 144 and 145 to top air conduit 146 for middle compartment 116 and through conduits 147 and 148 to material conveying conduit 149. Top air conduit 146 is attached to (or terminates in) pressurizing gas inlet 150 of middle compartment 116. Preferably, the pressurizing gas inlet is located generally above the level of particulate material in the product compartment of the container. Operation of the blower will move air or gas through top air conduit 146 into the middle compartment, thereby increasing the pressure of the air or gas in the compartment in order to assist in discharging material from the outlets into material conveying conduit 149. As shown in FIG. 12, material conveying conduit 149 extends past and connects to each of the hopper material outlets of product compartment 116. When the system is operating and pressurizing gas is flowing from the blower and into material conveying conduit 149, valves 154, 156 and 160 maybe opened to discharge particulate material into conduit 149, where such material may be entrained and transported to discharge end 162 of the conduit.

As shown in FIGS. 12 and 14, bulkheads 121 and 123 are arranged at an angle, but with their convex sides facing into compartment 116. This arrangement permits the size of the compartments to be varied from that shown in the embodiment of FIGS. 1–5. However, as in the embodiment of container 20, the amount of curvature in the preferred bulkheads will depend on the pressure differential between the pressurized and unpressurized compartments, the thickness and type of material from which the bulkhead is formed and the shape and size of the compartment walls.

Referring now to FIGS. 14 and 15, the pressurizing system for the front and rear compartments is illustrated. As shown therein, one end of conduit 142 is attached to the blower and the other end is attached to conduit 163. Conduit 163 directs pressurizing gas through conduits 164 and 165 to top air conduit 166 for front compartment 114, to top air conduit 167 (a continuation of conduit 166) for rear compartment 118 and through conduits 168 and 169 to material transport conduit 170. Top air conduit 166 is attached to pressurizing gas inlet 171 of front compartment 114 and top air conduit 167 is attached to pressurizing gas inlet 172 of rear compartment 118. Preferably, the pressurizing gas inlets are located generally above the level of particulate material in the front and rear product compartments of the container. Operation of the blower will move air or gas through top air conduit 166 into the front compartment and through top air conduit 167 into the rear compartment, thereby increasing the pressure of the air or gas in the front and rear compartments in order to assist in discharging material from the outlets into material conveying conduit 170. As shown in FIG. 13, material conveying conduit 170 extends past and connects to each of the hopper material outlets of product compartments 114 and 118. When the system is operating and pressurizing gas is flowing from the blower and into material conveying conduit 170, valves 134 and 136 may be opened to discharge particulate material into conduit 170, where such material may be entrained and transported to discharge end 174 of the conduit.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, as would be understood by those having ordinary skill in the art to which the invention relates, and the same are intended to be comprehended within the meaning and range of equivalents of the appended claims.

What is claimed is:

1. A container for use in transporting particulate materials, said container comprising:
    (a) a plurality of product compartments, with each such compartment having a material outlet in communication therewith through which particulate material in the compartment may be discharged;
    (b) a gas-tight bulkhead separating a pair of adjacent product compartments;
    (c) an unloading system that is adapted for removal of particulate materials from the product compartments, said unloading system including:
        (i) a source for supplying a pressurizing gas;
        (ii) one or more top air conduits connecting the pressurizing gas source to the product compartments for conveying pressurizing gas to the product compartments;
        (iii) a material conveying conduit that is in fluid communication with a plurality of the material outlets, which conduit includes a discharge end through which particulate material may be unloaded;
    which unloading system is adapted for:
        (iv) selectively pressurizing one or more of the product compartments so that particulate material may be discharged through the material outlet of a product compartment that is pressurized;
        (v) entraining material that is discharged through a material outlet in the material conveying conduit and conveying such material to the discharge end of the conduit.

2. The container of claim 1 wherein the unloading system is adapted for selectively pressurizing one or more of the product compartments without simultaneously pressurizing all of the product compartments.

3. The container of claim 1 which comprises:
    (a) a front product compartment having a front material outlet that is in communication therewith;
    (b) a middle product compartment having a middle material outlet that is in communication therewith;
    (c) a first gas-tight bulkhead between the front compartment and the middle compartment;
    (d) a rear product compartment having a rear material outlet that is in communication therewith;
    (e) a second gas-tight bulkhead between the middle compartment and the rear compartment;
    (f) a first top air conduit connecting the pressurizing gas source with the front compartment and the rear compartment for conveying pressurizing gas to the front compartment and the rear compartment;

(g) a second top air conduit connecting the pressurizing gas source with the middle compartment for conveying pressurizing gas to the middle compartment;

(h) a valve for selectively directing pressurizing gas into either the first top air conduit or the second top air conduit;

(i) a material conveying conduit which is in fluid communication with the pressurizing gas source and the front, middle and rear material outlets.

4. The container of claim 3 which includes a bypass circuit by which pressurizing gas may be selectively directed into the front product compartment and the rear product compartment, the front product compartment but not the rear product compartment, or the rear product compartment but not the front product compartment.

5. The container of claim 3 in which:
(a) the first gas-tight bulkhead is convex in shape and arranged with its convex side facing into the middle compartment; and
(b) the second gas-tight bulkhead is convex in shape and arranged with its convex side facing into the middle compartment.

6. The container of claim 3 in which:
(a) the first gas-tight bulkhead is arranged at an angle between the front compartment and the middle compartment; and
(b) the second gas-tight bulkhead is arranged at an angle between the middle compartment and the rear compartment.

7. A container for use in transporting particulate materials, said container comprising:
(a) a front product compartment having a front material outlet that is in communication therewith;
(b) a middle product compartment having a middle material outlet that is in communication therewith;
(c) a first gas-tight bulkhead between the front compartment and the middle compartment;
(d) a rear product compartment having a rear material outlet that is in communication therewith;
(e) a second gas-tight bulkhead between the middle compartment and the rear compartment;
(f) a first top air conduit connecting the pressurizing gas source with the front compartment and the rear compartment for conveying pressurizing gas to the front compartment and the rear compartment;
(g) a front pressurizing gas inlet for conveying pressurizing gas from the first top air conduit into the front compartment;
(h) a rear pressurizing gas inlet for conveying pressurizing gas from the first top air conduit into the rear compartment;
(i) a second top air conduit connecting the pressurizing gas source with the middle compartment for conveying pressurizing gas to the middle compartment;
(j) a middle pressurizing gas inlet for conveying pressurizing gas from the second top air conduit into the middle compartment;
(k) a valve for selectively directing pressurizing gas into either the first top air conduit or the second top air conduit;
(l) a material conveying conduit which is in fluid communication with the pressurizing gas source and the front, middle and rear material outlets, which conduit includes a discharge end through which particulate material may be unloaded.

8. The container of claim 7 wherein the unloading system is adapted for selectively pressurizing the front and rear product compartments without simultaneously pressurizing the middle product compartment.

9. The container of claim 7 which includes a bypass circuit by which pressurizing gas may be selectively directed into the front product compartment and the rear product compartment, the front product compartment but not the rear product compartment, or the rear product compartment but not the front product compartment.

10. A method for unloading particulate material from a product compartment of a container, which method comprises:
(a) providing a container for use in transporting particulate materials, said container comprising:
(i) a plurality of product compartments, with each such compartment having a material outlet in communication therewith through which particulate material in the compartment may be discharged;
(ii) a gas-tight bulkhead separating a pair of adjacent product compartments;
(iii) a source for supplying a pressurizing gas;
(iv) one or more top air conduits connecting the pressurizing gas source to the product compartments for conveying pressurizing gas to the product compartments;
(v) a material conveying conduit that is in fluid communication with a plurality of the material outlets, which conduit includes a discharge end through which particulate material may be unloaded;
(b) pressurizing a product compartment without pressurizing all of the product compartments;
(c) discharging particulate material through the material outlet of a product compartment which is pressurized into the material conveying conduit;
(d) entraining material in the material conveying conduit and conveying such material to the discharge end of the conduit.

11. The method of claim 10 which includes the following step instead of step (a):
(a1) providing a container for use in transporting particulate materials, said container comprising:
(i) a front product compartment having a front material outlet that is in communication therewith;
(ii) a middle product compartment having a middle material outlet that is in communication therewith;
(iii) a first gas-tight bulkhead between the front compartment and the middle compartment;
(iv) a rear product compartment having a rear material outlet that is in communication therewith;
(v) a second gas-tight bulkhead between the middle compartment and the rear compartment;
(vi) a first top air conduit connecting the pressurizing gas source with the front compartment and the rear compartment for conveying pressurizing gas to the front compartment and the rear compartment;
(vii) a front pressurizing gas inlet for conveying pressurizing gas from the first top air conduit into the front compartment;
(viii) a rear pressurizing gas inlet for conveying pressurizing gas from the first top air conduit into the rear compartment;
(ix) a second top air conduit connecting the pressurizing gas source with the middle compartment for conveying pressurizing gas to the middle compartment;

(x) a middle pressurizing gas inlet for conveying pressurizing gas from the second top air conduit into the middle compartment;

(xi) a valve for selectively directing pressurizing gas into either the first top air conduit or the second top air conduit;

(xii) a material conveying conduit which is in fluid communication with the pressurizing gas source and the front, middle and rear material outlets, which conduit includes a discharge end through which particulate material may be unloaded.

12. The method of claim 11 which includes the following step instead of step (b):

(b1) selectively pressurizing the front and rear product compartments without simultaneously pressurizing the middle product compartment;

and which includes the following step instead of step (c):

(c1) discharging particulate material through the material outlet of the front and rear product compartments into the material conveying conduit.

13. The method of claim 11 which includes the following step instead of step (a1):

(a2) providing a container for use in transporting particulate materials, said container comprising:

(i) a front product compartment having a front material outlet that is in communication therewith;

(ii) a middle product compartment having a middle material outlet that is in communication therewith;

(iii) a first gas-tight bulkhead between the front compartment and the middle compartment;

(iv) a rear product compartment having a rear material outlet that is in communication therewith;

(v) a second gas-tight bulkhead between the middle compartment and the rear compartment;

(vi) a first top air conduit connecting the pressurizing gas source with the front compartment and the rear compartment for conveying pressurizing gas to the front compartment and the rear compartment;

(vii) a front pressurizing gas inlet for conveying pressurizing gas from the first top air conduit into the front compartment;

(viii) a rear pressurizing gas inlet for conveying pressurizing gas from the first top air conduit into the rear compartment;

(ix) a second top air conduit connecting the pressurizing gas source with the middle compartment for conveying pressurizing gas to the middle compartment;

(x) a middle pressurizing gas inlet for conveying pressurizing gas from the second top air conduit into the middle compartment;

(xi) a valve for selectively directing pressurizing gas into either the first top air conduit or the second top air conduit;

(xii) a material conveying conduit which is in fluid communication with the pressurizing gas source and the front, middle and rear material outlets, which conduit includes a discharge end through which particulate material may be unloaded (xiii) a bypass circuit by which pressurizing gas may be selectively directed into the front product compartment and the rear product compartment, the front product compartment but not the rear product compartment, or the rear product compartment but not the front product compartment;

and which includes the following step instead of step (b):

(b2) pressurizing the front product compartment without pressurizing the middle and the rear product compartments;

and which includes the following step instead of step (c):

(c2) discharging particulate material through the material outlet of the front product compartment into the material conveying conduit.

* * * * *